United States Patent [19]
Sartorio

[11] Patent Number: 5,176,022
[45] Date of Patent: Jan. 5, 1993

[54] SHEET WORKPIECE MANIPULATING DEVICE FOR A BENDING PRESS

[75] Inventor: Franco Sartorio, Turin, Italy

[73] Assignee: Amada Company, Limited, Japan

[21] Appl. No.: 567,727

[22] Filed: Aug. 15, 1990

[30] Foreign Application Priority Data

Aug. 16, 1989 [IT] Italy .................. 67703 A/89
Aug. 16, 1989 [IT] Italy .................. 67704 A/89

[51] Int. Cl.$^5$ .......................................... B21J 13/10
[52] U.S. Cl. ................................. 72/420; 72/422;
  901/40; 901/6; 294/64.1; 414/753
[58] Field of Search ............ 72/420, 422; 901/6,
  901/16, 17, 18, 40; 414/226, 752, 753; 264/276;
  294/65

[56] References Cited

U.S. PATENT DOCUMENTS

| 763,710 | 6/1904 | Berghof et al. ............... 72/422 |
| 2,807,029 | 9/1957 | Armstrong ................. 294/64.1 |
| 3,227,240 | 1/1966 | Lemelson ..................... 901/40 |
| 3,834,555 | 9/1974 | Bennington et al. ............ 901/40 |
| 3,901,392 | 8/1975 | Streckert ..................... 901/40 |
| 4,228,993 | 10/1980 | Cathers ....................... 901/40 |
| 4,555,217 | 11/1985 | Wright ....................... 414/735 |
| 4,648,786 | 3/1987 | Sakurai ....................... 901/16 |
| 4,827,757 | 5/1989 | Sartorio ....................... 72/420 |
| 4,989,444 | 2/1991 | Murakami et al. ............... 901/40 |

FOREIGN PATENT DOCUMENTS

| 2154287 | 5/1973 | Fed. Rep. of Germany ...... 269/276 |
| 0022271 | 2/1977 | Japan ......................... 901/40 |
| 0095591 | 4/1990 | Japan ......................... 901/40 |
| 1071422 | 2/1984 | U.S.S.R. ...................... 901/40 |

*Primary Examiner*—John Sipos
*Assistant Examiner*—Michael J. McKeon
*Attorney, Agent, or Firm*—Wigman & Cohen

[57] ABSTRACT

A sheet workpiece manipulating apparatus for delivering, supporting, and removing large sheet workpieces to a sheet bending press includes a plurality of rotationally and linearly translatable support arms. A gripping device is disposed on each free end of each support arm. The sheet workpiece is captured and rigidly restrained by the paired gripping devices, such as opposing suction cups operationally connected to a vacuum source, which are detachably attached to the support arms in a magnetically cooperating arrangement. Large gripping forces are developed by the gripping devices, which are separately replacable with alternate gripping devices sized to accommodate workpieces of different sizes, shapes, and materials, as well as a particular manipulation procedure. Perforated as well as imperforated sheets may be manipulated by the apparatus due to the paired, opposing relationships of the suction cups.

22 Claims, 10 Drawing Sheets

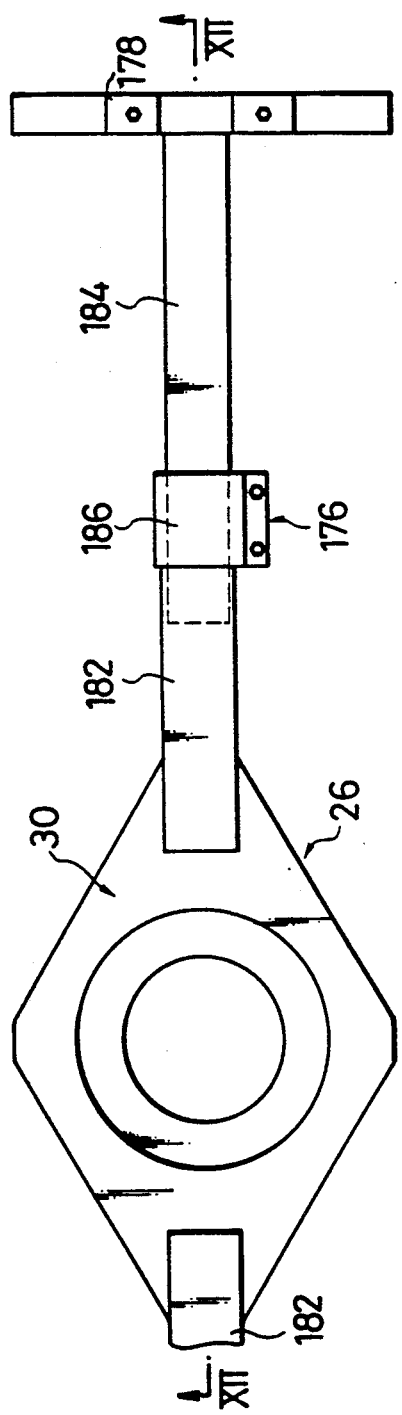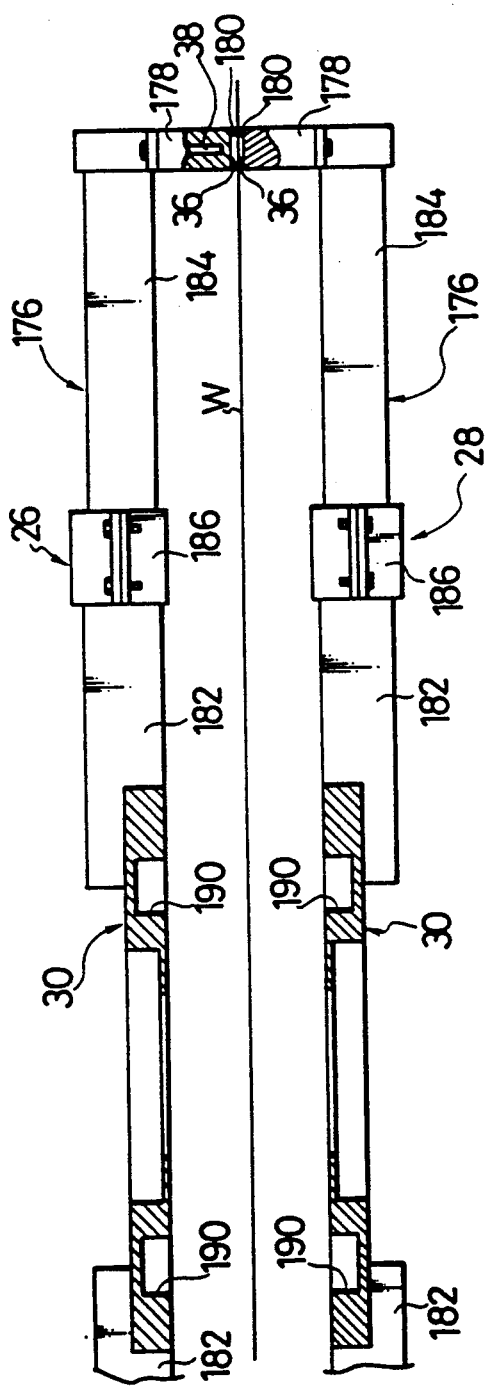

SHEET WORKPIECE MANIPULATING DEVICE FOR A BENDING PRESS

BACKGROUND OF THE INVENTION

1. Field of the Invention

This invention relates to a sheet workpiece manipulating device for a bending press.

2. Description of the Prior Art

Conventional sheet workpiece manipulating device for a bending press is provided with a device for gripping a sheet workpiece in front of the bending machine, and a supporting member mounted on a front frame of the bending press, for supporting the gripping device in a manner such that the sheet workpiece gripped by the gripping device is moved along three cartesian axes, and rotated about two perpendicular axes (see, for example, U.S. Pat. No. 4,829,757).

With this conventional sheet workpiece manipulating device, a sheet workpiece can be positioned at a desired position with respect to a bending tool of the bending press, and can be turned over so as to be subjected to a reverse bending operation.

In addition, with the help of an auxially manipulator, which is mounted on a side section of the bending machine, the above manipulator can provide, for example, all of the four edges of a rectangular sheet workpiece to the bending machine, whereby a box-like product is produced.

However, such conventional sheet workpiece manipulating device is not suitable for handling a large workpiece.

Conventional gripping devices, which is provided, for example, on a sheet workpiece manipulating device such as the above, includes motor-driven arms carrying gripping structures that may be provided with a plurality of suction cups connected to a vacuum source. In order to grip a sheet, the structure is placed on the surface of the sheet to be lifted and the suction cups are then connected to the vacuum source. Devices of this type do not lend themselves to gripping metal sheets in which holes have already been made, since the suction cups obviously lose their effectiveness if they are situated in correspondence with a hole. Moreover, a metal sheet gripped by means of suction cups is quite unstable due to the resilience of the suction cups.

For a gripping device mounted on the manipulating device, mechanical gripping devices are also known and include one or more motor-driven manipulating grips for gripping a sheet at one of its edges. In this case, the support arms of the manipulating grips must be sized to withstand the gripping force of the grips, as well as to bear the weight of the metal sheet and the dynamic stresses resulting from its movement.

SUMMARY OF THE INVENTION

An object of the present invention is to provide a manipulator device which is very flexible in use and completely replaces the manual manipulation of metal sheets during a complex series of successive operations from the picking up of the metal sheet to the depositing of the semi-finished piece, and which is particularly suitable for the manipulation of large metal sheets.

According to the present invention, this object is achieved by a device for manipulating sheets of metal, comprising: a support mechanism provided in front of the bending machine; a first arm means provided on the support mechanism, free to rotate about a horizontal axis D; a second arm means provided on a free end of the first arm means, free to rotate about an axis F perpendicular to the horizontal axis D; a sheet workpiece gripping means provided on a free end of the second arm means, free to rotate about an axis parallel to the axis F, and the sheet workpiece gripping means gripping the sheet workpiece in a plane perpendicular to the axis G.

The manipulator device according to the present invention enables the metal sheets to be supplied to the machine associated therewith in all the positions required by complex working cycles and also enables the elements for gripping the metal sheets to be replaced quickly so as to be adapted to the shape and sizes of the sheet being worked and to the working conditions. As will become clear below, the device according to the present invention is particularly suitable for the manipulation of large sheets.

Another object of the present invention is to provide a simple and reliable gripping device which does not have the problems mentioned above.

According to the present invention, this object is achieved by a device for gripping sheets of metal, comprising: a pair of opposed arms; and a pair of sheet workpiece gripping pads, each provided on each of the opposed free ends of the opposed arms, and the gripping pads being provided with suction cup section capable of adhering to the opposite faces of a sheet workpiece.

The vacuum tends to press each of the two gripping elements against the metal sheet or, if the sheet has holes in correspondence with the gripping surface, to compress the two gripping elements against each other, with a force which is proportional to the vacuum applied and the surface area of the gripping elements. The device according to the invention enables large gripping forces to be exerted at will without a reaction force being exerted on the support structure of the gripping elements. The device according to the invention is particularly useful for handling large metal sheets whose thickness is much less than the linear extent of the sheet (of the order of magnitude of 1/1000) so that a region near the edges of the sheet can be worked. The gripping devices provides the metal sheet with considerable rigidity and thus enables the rapid execution of complex movements and rotations of the sheet which, without adequate support, would tend to bend and collapse due both to its own weight and inertial forces.

Other objects, features and advantages of the invention will be readily apparent from the following description of preferred embodiments thereof, taken in conjunction with the accompanying drawings, although variations and modifications may be effected without departing from the spirit and scope of the novel concepts of the disclosure, and in which:

BRIEF DESCRIPTION OF THE DRAWINGS

FIG. 11 is a schematic plan view of part of a third embodiment of the gripping device according to the invention.

FIG. 12 is a section taken on the line XII—XII of FIG. 11.

DESCRIPTION OF THE PREFERRED EMBODIMENTS

Figure 1:
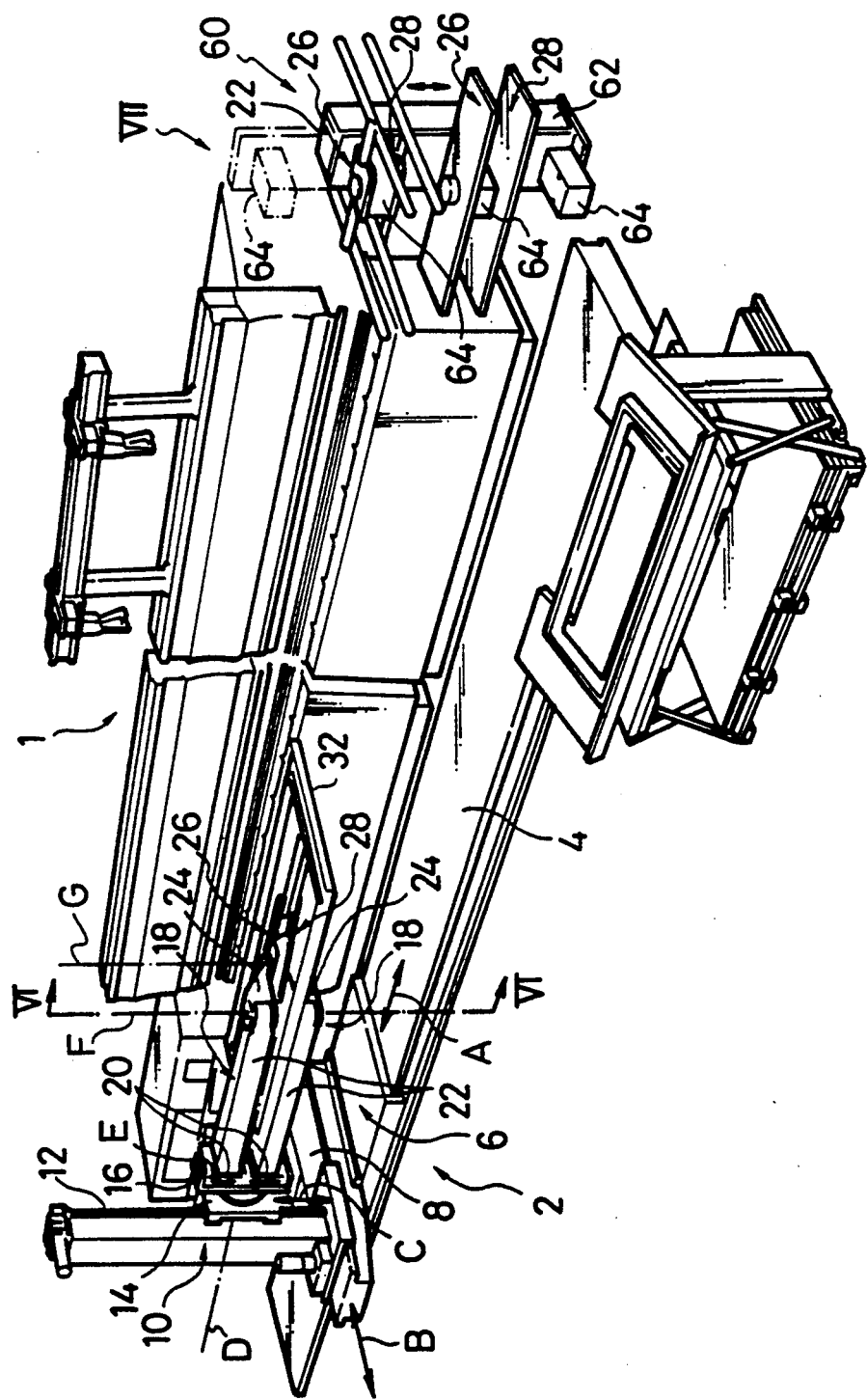
FIG. 1 is a schematic perspective view of an embodiment of a manipulator device according to the present invention coupled to a bending press.

In FIG. 1, a bending press of known type is indicated 1 and a device for manipulating metal sheets, generally indicated 2, is associated therewith. The manipulator device 2 includes a guide structure 4 which is fixed to the floor and extends horizontally parallel to the front of the bending press 1 and to the line of bending thereof (that is, the line of the vertex of the bending dihedral of the die). A slide 6 is mounted on the guide structure 4 and is movable in the direction indicated by the double arrow A in FIG. 1. The upper part of the slide 6 constitutes a guide 8 which extends perpendicular to the direction A and the bending plane of the press 1. An upright 10 is slidably mounted on the guide 8 and is movable in the direction indicated by the arrow B. The upright 10 has a vertical guide (perpendicular to the plane defined by the directions A and B) on which a carriage 14 is mounted for sliding in the direction indicated by the arrow C. The carriage 14 supports a guide element 16 which is mounted on the carriage 14 for rotation about a horizontal axis D parallel to the line of bending of the press 1. The elements 4, 6, 10, 14 and 16 together will briefly be described below as the "base structure".

The guide element 16 carries a pair of support arms 18, each of which has a first end 20 mounted for sliding relative to the guide element 16 in the direction indicated by the arrow E. Each arm 18 is constituted by a first section 22 carried by the guide element 16 and a second section 24 articulated to the free end of the first section 22 about an axis F parallel to the direction of sliding E of the first sections 22. The second sections 24 extend perpendicular to the first sections 22 in a generally L-shaped arrangement and have operating means (not shown) for causing the second sections to rotate simultaneously through 180° about the axis F.

The free ends of the second sections 24 of the support arms 18 carry respective opposed gripping elements (sheet workpiece gripping pad) 26 and 28 which are mounted on the second sections 24. In order to grip a metal sheet W, the support arms 18 are moved towards each other so as to bring the gripping elements 26, 28 into contact with the opposite faces of the sheet W and the vacuum source is activated. The opposed gripping elements 26 and 28 is referred to as a "a gripping device".

Figure 2:
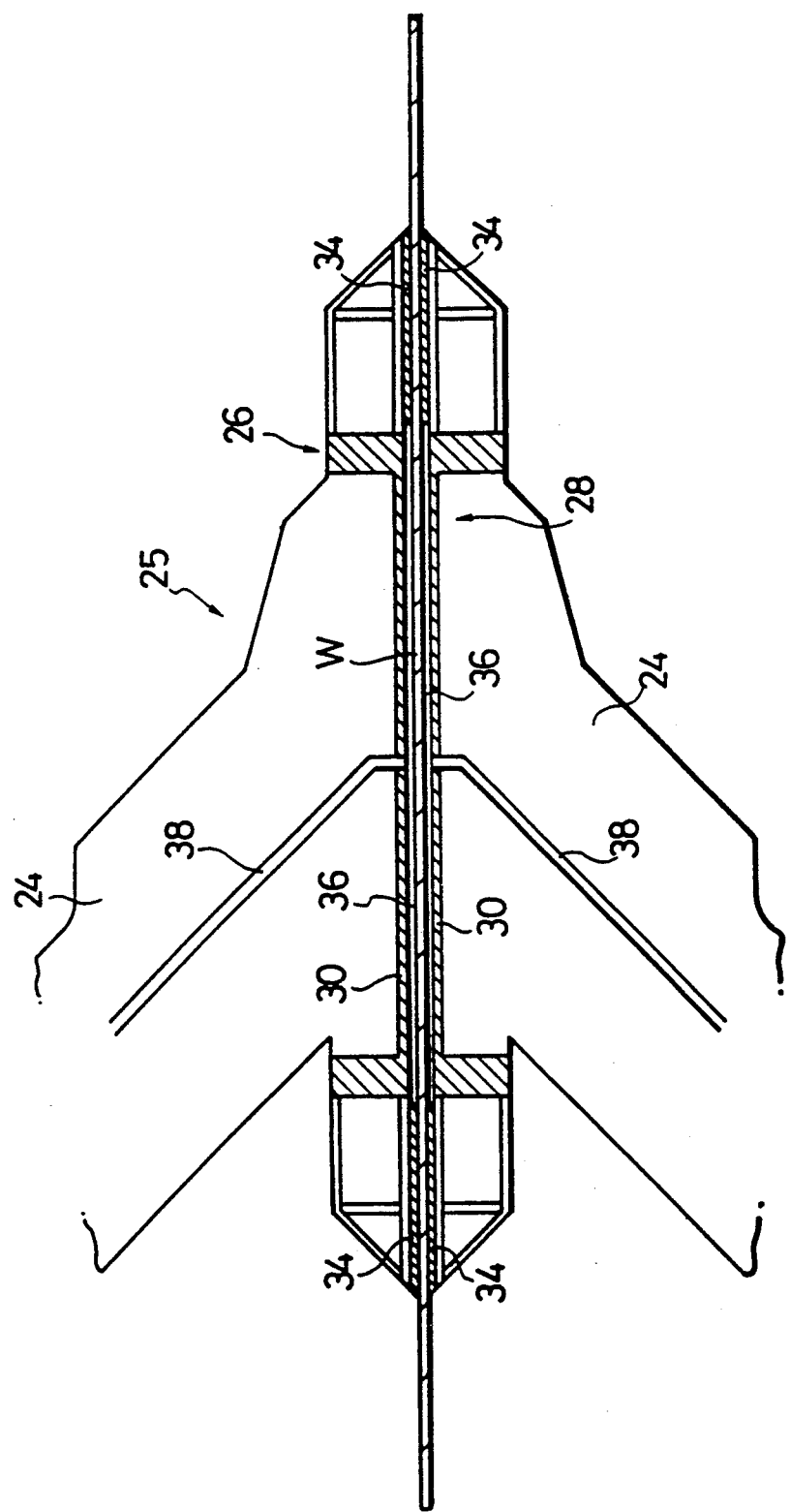
FIG. 2 is a schematic view showing the operating principle of the gripping device provided on the manipulator device.

With reference to FIG. 2, the operating principle of the gripping device is first described. The gripping device 25 is constituted substantially by first and second, opposed gripping elements, indicated 26 and 28 respectively, arranged symmetrically with respect to the plane containing a metal sheet W to be handled. Each gripping element 26, 28 is constituted by a base body 30 which is generally plate-shaped and, on its surface facing the sheet W, carries a fairly wide seal 34 which extends in a loop and defines the side wall of a pneumatic chamber 36. As will be made clearer below, the pneumatic chamber 36 of each gripping element 26, 28 is connected to a vacuum source (not shown) by means of a respective suction duct 38.

As will be explained below, the base body 30 of each gripping element 26, 28 is connected to the motor-driven support arm 24' by rapid attachment means which enable the gripping elements 26, 28 to be replaced quickly so that gripping elements 26, 28 of a suitable shape and size for the metal sheet W to be moved can be used.

The gripping device 25 operates as follows. The support arms 24, which are operated by control means, bring the gripping elements 26, 28 into contact with the opposite faces of a metal sheet W to be gripped and the seals 34 bear on the surfaces of the sheet W to define an airtight contact surface. If the metal sheet W has holes, the seals 34 must completely surround the holes so as to ensure the airtightness of the chambers 36. The vacuum source is then activated and draws out the air in the pneumatic chambers 36. The vacuum which is created in the pneumatic chambers 36 tends to press the two gripping elements 26, 28 against each other so that the seals 34 constitute members for gripping the metal sheet W.

Figure 3:
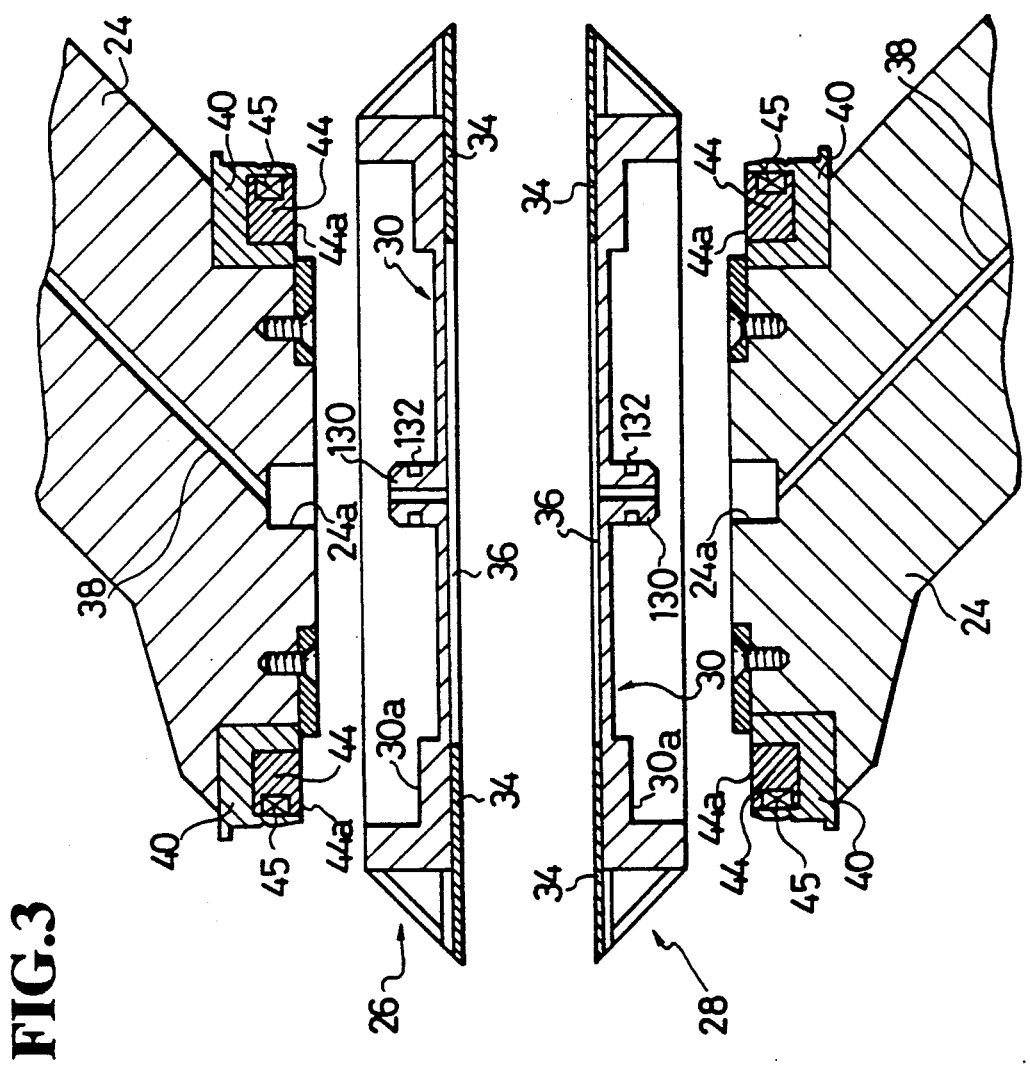
FIG. 3 is an exploded cross-section of a first embodiment of the gripping device according to the invention.
Figure 4:
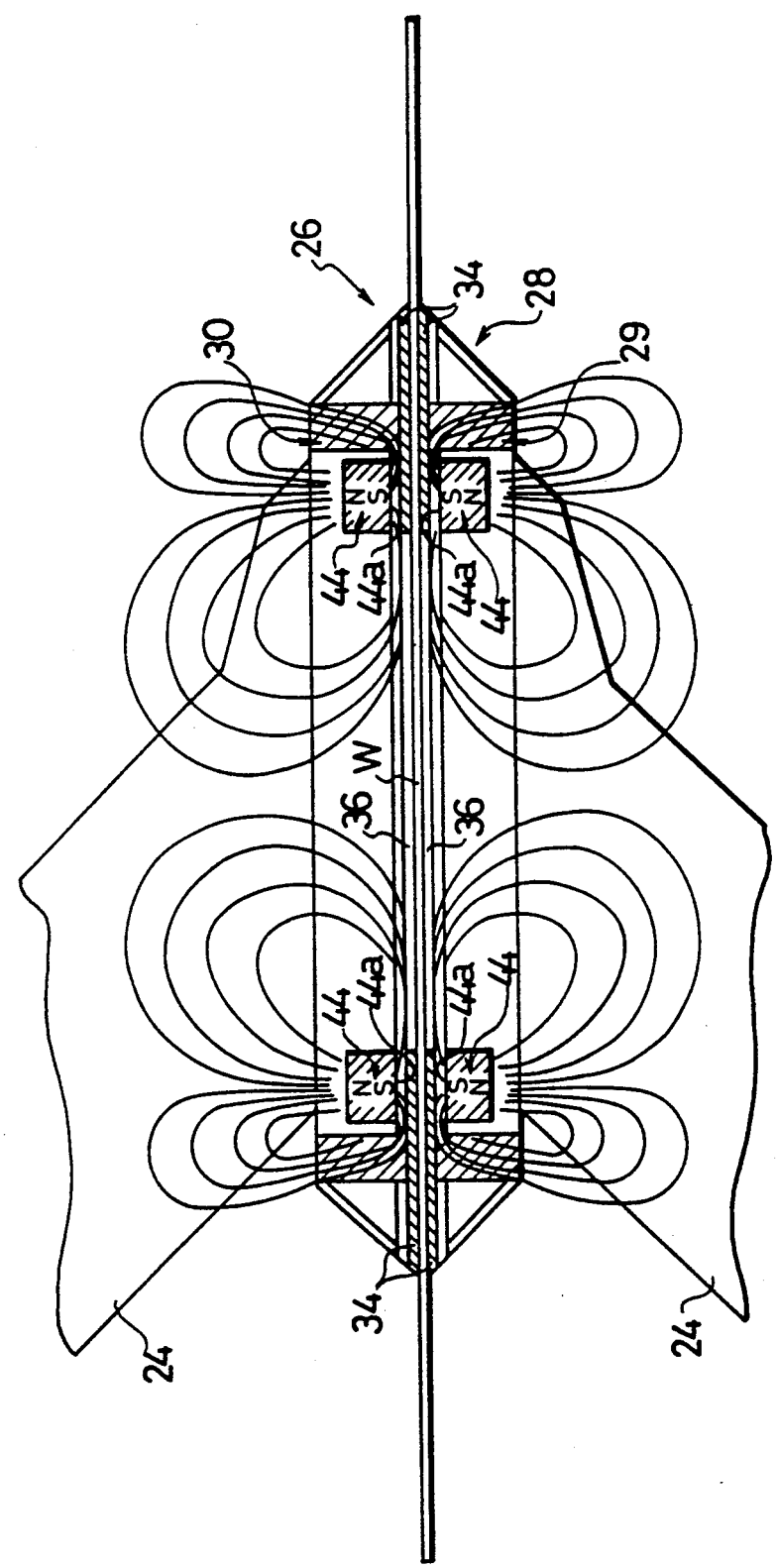
FIG. 4 is a schematic cross-section showing a first system for connecting the gripping elements to the support structure.

FIGS. 3 and 4 show a first system for the rapid attachment of the gripping elements 26, 28 to the support arms 24. As can be seen in FIG. 3, the surface of the base body 30 of each gripping element 26, 28 opposite that which carries the seal 34 has a recessed seat 30a for coupling to an intermediate body 40 carried by the support arm 24. Each intermediate body 40 carries an annular permanent magnet 44 one surface 44a of which is intended to adhere to the base wall of the recessed seat 30a, which is of ferromagnetic material, in the respective gripping element 26, 28. As shown in FIG. 4, the opposing surfaces 44a of the permanent magnets 44 have the same polarity so that the magnetic flux generated by the permanent magnets 44 is linked through the base bodies 30, which are made of a material with good magnetic permeability, in the manner shown in FIG. 4. The metal sheet W is therefore not significantly affected by the magnetic flux of the permanent magnets 44 and the unwanted residual magnetization of the sheet W, if it is ferromagnetic, is thus avoided. The permanent magnets 44 are surrounded by electrical coils 45 which, when a current flow through them, produce a magnetic flux opposite that generated by the permanent magnets 44, cancelling out the attractive force of the magnets 44 and enabling the gripping elements 26, 28 to be removed from the support arms 24 when they need to be replaced.

FIG. 3 shows that each base body 30 has an internally-bored engagement peg 130 which has a sealing ring 132 and is inserted in a chamber 24a of the support arm 24 to establish the connection between the pneumatic chamber 36 and the suction duct 38.

Figure 5:
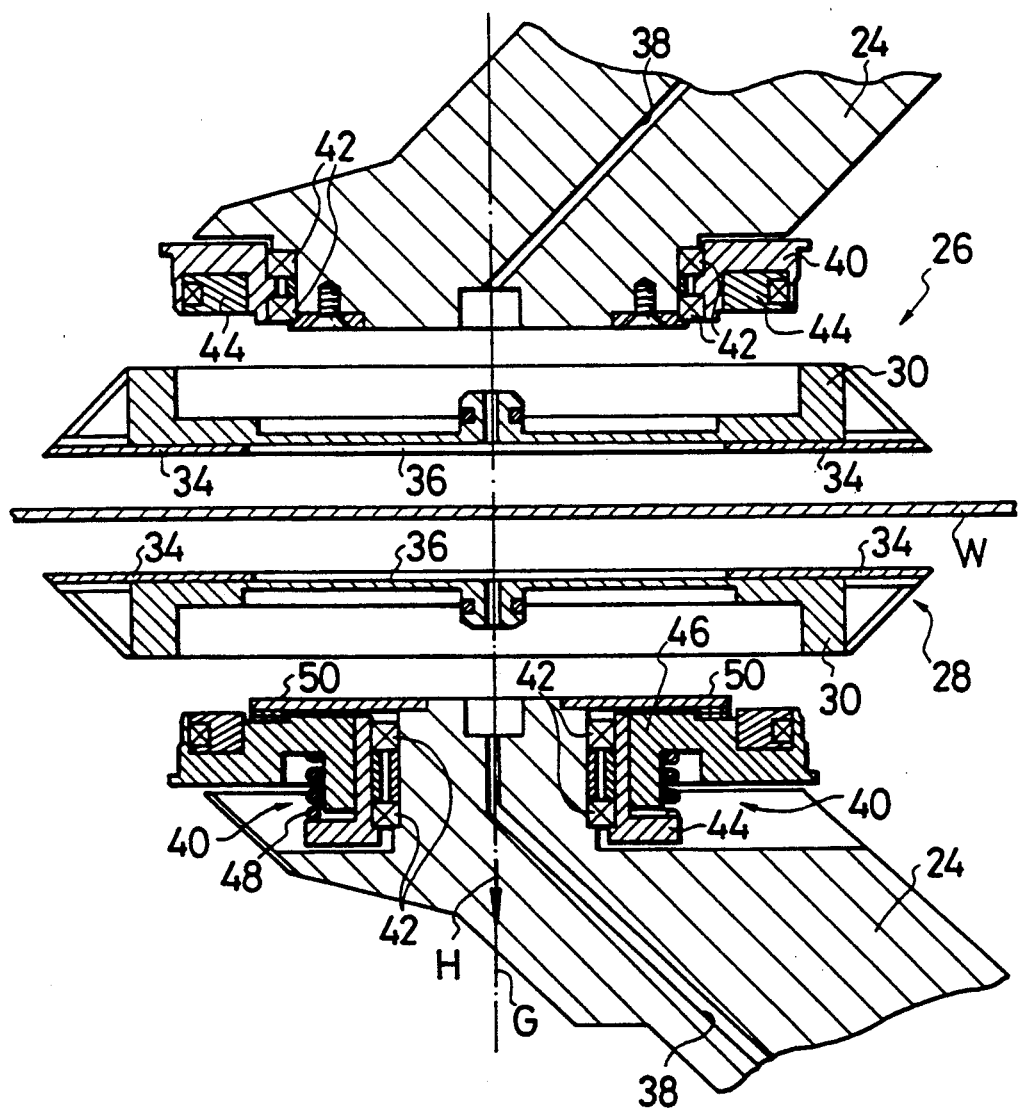
FIG. 5 is a schematic cross-section showing a second embodiment of the gripping device according to the invention.

FIG. 5 shows a second membodiment of the gripping device according to the invention.

The respective opposed gripping elements 26 and 28 are mounted on the second sections 24 for rotation about an axis G parallel to the articulation axis F of the second arms 24.

As can be seen in FIG. 5, the base body 30 of each gripping element 26, 28 is fixed by rapid attachment means to an intermediate body 40 carried by the second section 24 of the support arm 18. The inermediate body 40 is mounted for rotation about the axis G by means of rolling bearings 42. In the embodiment illustrated in the drawings, the means for the rapid attachment of the gripping element 26, 28 to the support arm 18 include a pair of permanent magnets 44 carried by the intermediate body 40.

Conventional operating means comprising as bevel gears are associated with the first gripping element 26 for making it rotate about the axis G. The second gripping element 28 lacks operating means and is entrained in rotation by the first gripping element 26 as a result of the force with which the gripping elements 26, 28 are urged by the vacuum against the metal sheet W to be moved. In order to prevent the gripping elements 26, 28 from ever being able to rotate independently of each other—which would bring the two elements 26, 28 into an out-of-phase arrangement—disabling means are associated with the gripping elements 26, 28 to prevent their rotation when they are not gripping a metal sheet W.

In the case of the second gripping element 28, the disabling means can be formed as shown in FIG. 5 and described below. The intermediate body 40 of the second gripping element 28 is constituted by a hub 44 which is mounted for rotation on the second section 24 of the support arm 18 by means of the bearings 42, and by an attachment element 46 which is mounted on the hub 44 for sliding along the axis G. The attachment element 46 is urged against a stop surface 50 fixed to the section 24 by a helical spring 48. The stop surface 50 has the function of preventing the attachment element 46—and hence the gripping element 28—from rotating about the axis G when the attachment element 46 is urged against the surface 50 by the spring 48. When a metal sheet W is gripped, the support arms 18 push the gripping elements 26, 28 towards one another. The force with which the gripping elements 26, 28 are pushed towards one another makes the attachment element 46 move away from the stop surface 50 in the direction indicated by the arrow H, against the action of the helical spring 48, enabling the second gripping element 28 to rotate.

As further protection against the accidental misalignment of the gripping elements 26, 28, each of these elements may be provided with an angular position sensor (for example, an absolute encoder). Out-of-phase conditions of the two gripping elements 26, 28 can be detected immediately.

The fact that the sheet W is gripped between two opposing elements which act on an extensive area of the sheet makes both the gripping action and the sheet W quite firm during the movement stage. It is therefore possible to carry out high-speed movements of the sheet W since the sheet W is supported extremely firmly and does not bend under the action of inertial forces.

Although the sections 22, 24 of the support arms 18 must be very long in order to be able to reach the central part of a large metal sheet, they can be thin and light since they are dimensioned for supporting only the weight and dynamic stresses arising from the metal sheet W and the gripping elements 26, 28 and not for transmitting the large clamping force of the gripping elements 26, 28 because this force is generated by the vacuum and is discharged in the gripping zone without affecting the support arms 18.

Figure 6:
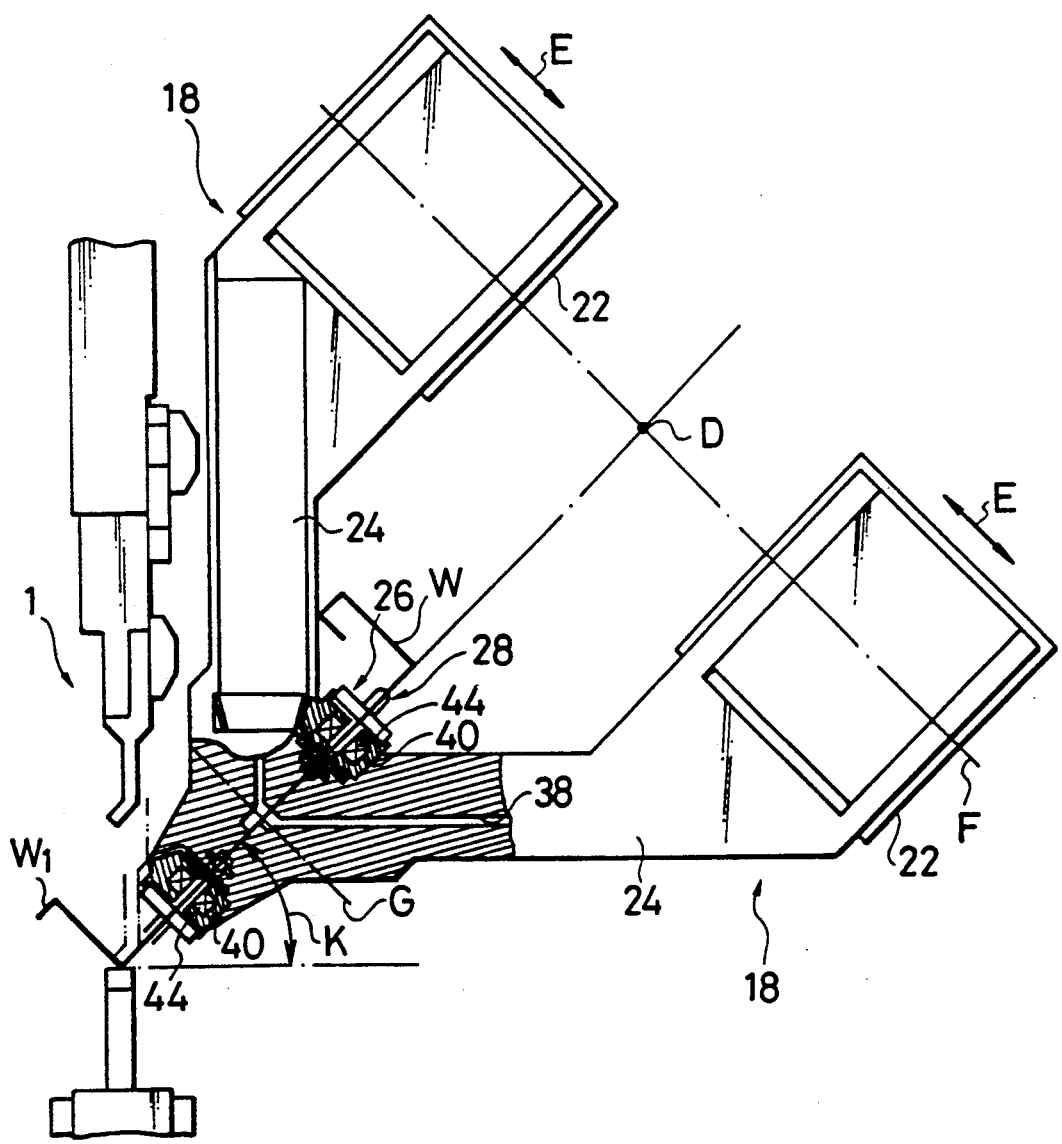
FIG. 6 is a schematic section taken on the line II—II of FIG. 1, on an enlarged scale.

Referring to FIG. 6, whilst it is particularly suitable for the manipulation of large metal sheets, by virtue of the particular arrangement of the second sections 24, the manipulator device 2 can also be used advantageously with small sheets. The second sections 24 have an angled shape so that the gripping elements 26, 28 are spaced from the first sections 22 of the support arms 18. By virtue of the rotation of the arms 18 about the axis D, the gripping elements 26, 28 can arrange the metal sheet W at any angle relative to the bending plane of the press 1. In FIG. 6, the gripping elements 26, 28 are at an angle k of half the bending angle set relative to the plane of presentation of the metal sheets W to the press 1, enabling the gripping elements 26, 28 to grip the metal sheet again after it has been bent. By virtue of the rotation of the arms 18 about the axis D, the metal sheet W can be turned over in order to form reverse bends, such as that indicated W1 in FIG. 6. However, the rotation of the arms 18 through 180° about the axis D means that the second sections 24 face in the opposite direction from the press 1; the rotation of the second sections 24 through 180° about the axis F returns the gripping elements 26, 28 to the correct position. The rotation of the gripping elements 26, 28 about the axis G enables the four sides of the metal sheet W to be bent sequentially without the need to change the point of gripping.

Figure 8:
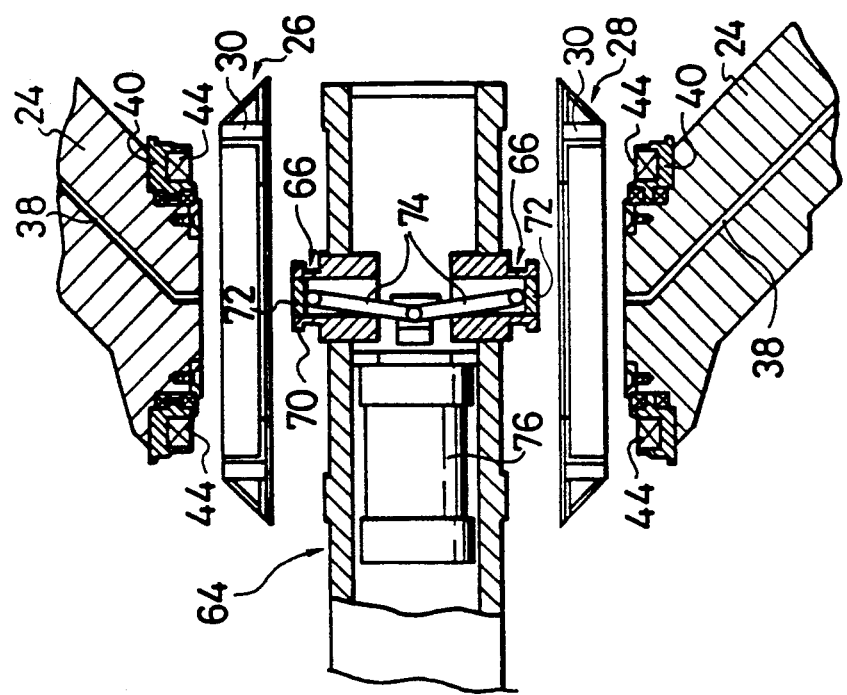
FIGS. 8 and 9 are respective sections taken on the lines VIII—VIII and IX—IX of FIG. 7.
Figure 7:
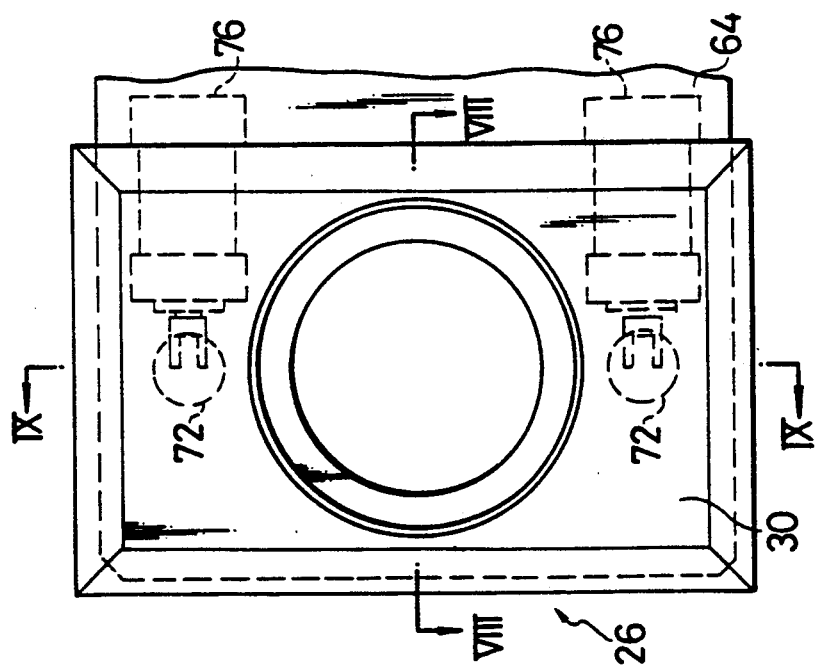
FIG. 7 is a plan view of an auxiliary device indicated by the arrow VII in FIG. 1.
Figure 9:
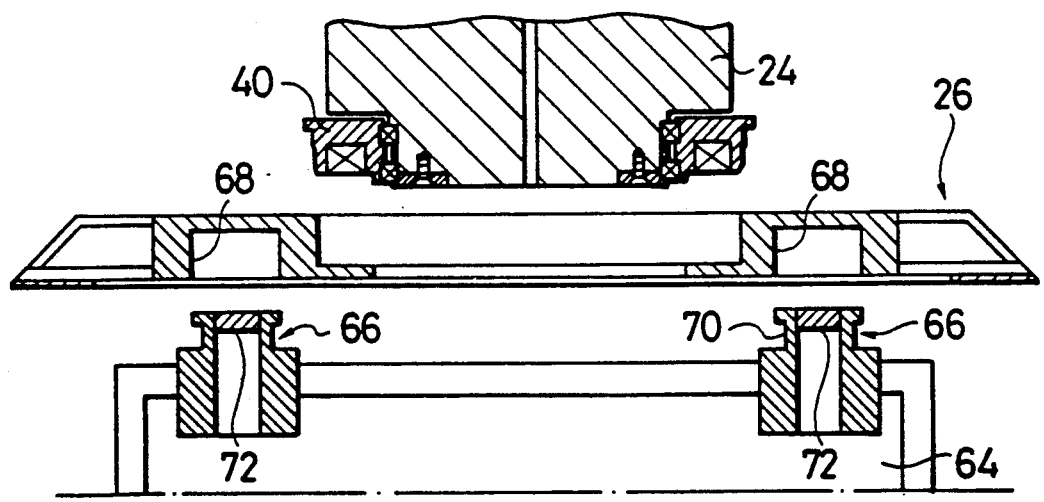

FIG. 1 shows an auxiliary device, indicated 60, for supporting gripping elements 26, 28 of assorted shapes and sizes which are rapidly substituted for the gripping elements 26, 28 in use, in order to work different metal sheets or during different stages of the working of the same sheet. The auxiliary support device 60 includes a fixed structure 62 carrying a plurality of brackets 64, each of which is intended to support a pair of gripping elements 26, 28. As is shown in greater detail in FIGS. 7, 8 and 9, each bracket carries two pairs of retaining members 66 for insertion in corresponding seats 68 formed in the base body 30 of each gripping element 26, 28 (see FIG. 9). Each retaining member 66 comprises an outer tubular portion 70 which has longitudinal recesses (not visible in the drawings) and is resiliently deformable radially. The tubular portion 70 has a conical internal wall which converges outwardly and acts as a guide for a piston 72 which is connected to the rod of a fluid actuator 76 by means of a push rod 74. As can be seen in FIG. 8, the same actuator 76 operates the pistons 72 of two opposed members 66.

The manipulator device 2 provides for the automatic changing of the gripping elements 26, 28 by means of the following steps. The manipulator device 2 is brought, without a metal sheet, into correspondence with the auxiliary support device 60 and places the gripping elements 26, 28 respectively above and below a free bracket 64. The seats 68 of the gripping elements 26, 28 are then brought into engagement with the corresponding retaining members 66 and the actuator 76 is re-activated to thrust the pistons 72 outwardly so that they expand the tubular elements 70 radially and fix the gripping elements 26, 28 to the bracket 64. The manipulator device 2 then releases the gripping elements 26, 28 and brings the free ends of the support arms 18 into correspondence with the bracket 64 which carries the gripping members 26, 28 of a shape and size suitable for the next working stage.

Figure 10:
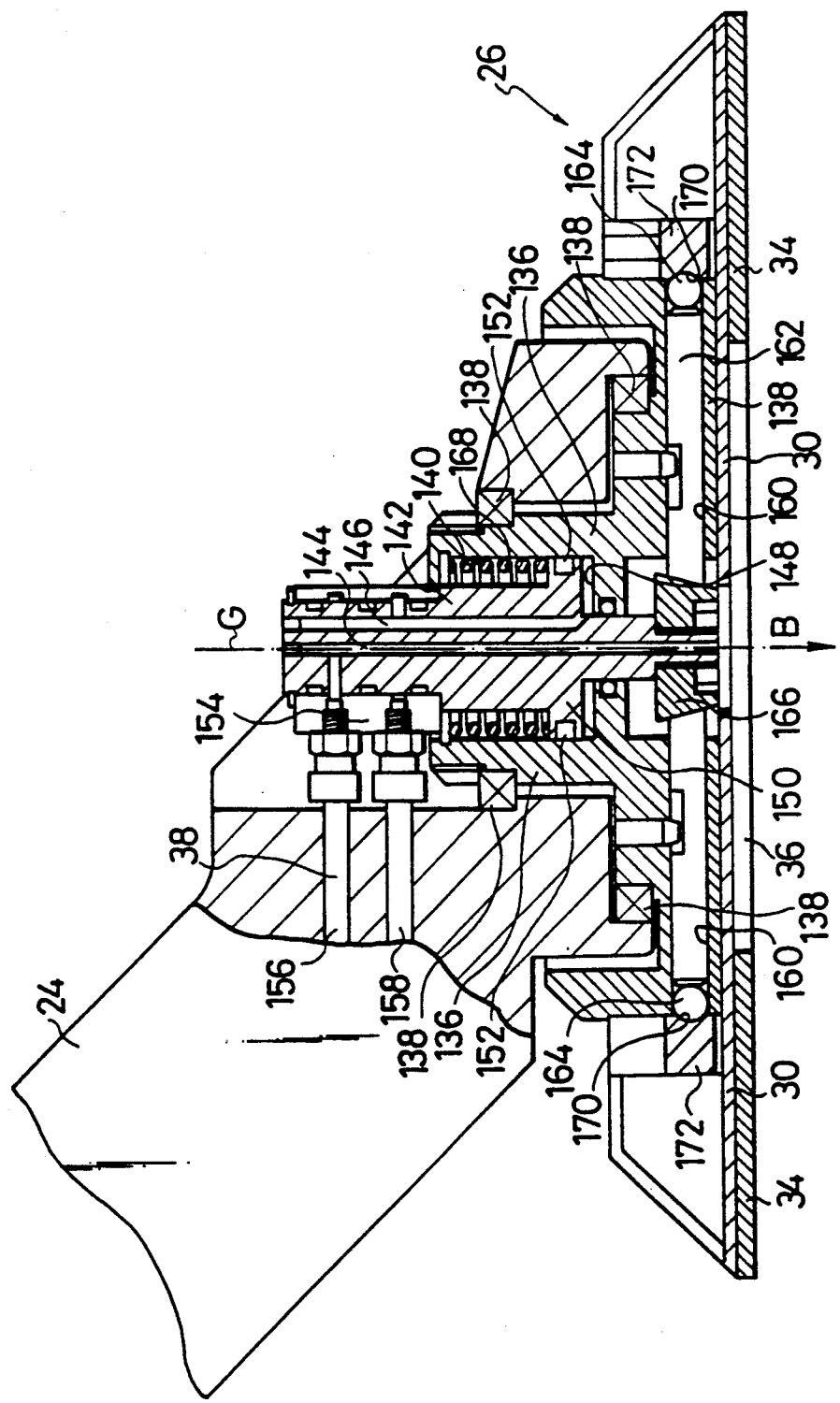
FIG. 10 is a cross-section showing a second system for connecting the gripping device to the support structure.

FIG. 10 shows a second system for the attachment of each gripping element 26, 28 to the respective support arm 24, which is mechanical rather than magnetic. The support arm 24 carries an intermediate body 136 which, in the embodiment illustrated in the drawing, is mounted for rotation relative to the arm 24 about its own axis of symmetry G by means of bearings 138. A chamber 140 is formed in the intermediate body 136 and an operating member 142 is sealingly slidably mounted therein. Two axial ducts, indicated 144 and 146 respectively, are formed in the operating member 142 and communicate respectively with the pneumatic chamber 36 and with a portion 148 of the chamber 140 which is separated from the rest of the chamber 140 by a wall 150 of the operating member 142 carrying a sealing ring 152. The ducts 144 and 146 communicate by means of a manifold 154 with respective ducts 156, 158 connected in turn to a vacuum source and a compressed-air source, respectively.

The intermediate body 136 has a plurality of radial holes 160 in which rods 162, each of which cooperates with a ball 164, are slidably mounted. The radially inner ends of the rods 162 cooperate with a frusto-conical element 166 fixed to the operating member 142. The operating member 142 is urged in the direction indicated by the arrow B by a helical spring 168 and the balls 164 are thus urged outwardly of the holes 160 to engage respective seats 170 formed in blocks 172 carried by the base body 30 of the gripping element 26. The gripping element 26 is released by sending compressed air to the portion 148 of the chamber 140 through the ducts 158, 146. The operating member 142 is thus displaced in the direction opposite that indicated by the arrow B, against the action of the helical spring 168, to release the balls 164 from the seats 170.

FIGS. 11 and 12 show an alternative embodiment of the gripping elements 26, 28. In this case, each gripping element 26, 28 comprises a base body 30 similar to that described above and intended for fixing to the respective support arm 24 by means of one of the systems described above. A pair of arms 176 carrying gripping members 178 at their free ends is fixed to the base body 30 of each of the gripping elements 26, 28. The gripping members 178 extend transverse to the arms 176 in a generally T-shaped arrangement and have seals 180 which enclose pneumatic chambers 36 and have the same function as the seals 34 described above. Each arm 176 is constituted by a first section 182 which is fixed to the base body 30 and a second section 184 which is mounted for sliding on the first arm 182 and is fixed thereto by means of a sleeve 186. The position of the gripping member 178 can be varied by sliding the second section 184 relative to the first section 182 in order to adapt the gripping element 26, 28 to the size of the metal sheet W to be gripped and, moreover the second section 184 which carries the gripping member 178 can be replaced by similar elements carrying gripping members 178 of different sizes.

The base bodies 30 of the gripping elements 26, 28 of both the types described above are also provided with seats 190 for engagement by a coupling device 66 (see FIGS. 7, 8 and 9) which supports the gripping elements 26, 28 when they are not mounted on the support arms 24.

What is claimed is:

1. A sheet workpiece manipulating apparatus for a bending machine, comprising:
a support mechanism provided in front of the bending machine;
a first arm means provided on the support mechanism, free to rotate about a horizontal axis D;
a second arm means provided on a free end of the first arm means, free to rotate about an axis F perpendicular to the horizontal axis D;
a sheet workpiece gripping means provided on a free end of the second arm means, free to rotate about an axis G parallel to the axis F, and the sheet workpiece gripping means gripping the sheet workpiece in a plane perpendicular to the axis G.

2. The sheet workpiece manipulating apparatus of claim 1, wherein the gripping device comprises means for adhering a surface of the workpiece.

3. The sheet workpiece manipulating apparatus of claim 2, wherein the bending machine comprises oblong upper and lower dies, and the second arm means is provided on the support mechanism, extending in the direction parallel to the longitudinal direction of the oblong upper and lower dies.

4. The sheet workpiece manipulating apparatus of claim 2, wherein the first arm means, the second arm means, and the workpiece gripping means comprises respectively a pair of first arms, a pair of second arms, and a pair of sheet workpiece gripping pads, each of the arms or the pads opposing to each other, and the sheet workpiece gripping pad being arranged to grip the workpiece therebetween.

5. The sheet workpiece manipulation apparatus of claim 4, wherein the sheet workpiece gripping pads are respectively provided with suction cup means, each of which comprises air tight perimeter section for adhering to the opposite faces of the sheet workpiece and the perimeter section defining the perimeter of respective pneumatic chambers which are connected to a vacuum source in use.

6. The sheet workpiece manipulation apparatus of claim 5, wherein the sheet workpiece gripping pads respectively comprise means for detecting the magnitude of the vacuum in the pneumatic chamber.

7. The sheet workpiece manipulating apparatus of claim 4, wherein a pair of the first arms are mounted on the support mechanism so as to be movable toward and away from each other, thereby the pair of sheet workpiece gripping pads being moved toward and away from each other.

8. The sheet workpiece manipulating apparatus of claim 7, wherein at least one of the pair of the second arms comprises brake means for preventing the sheet workpiece gripping pad to rotate about the axis G with respect to the second arm that is provided with the brake means.

9. The sheet workpiece manipulating apparatus of claim 8, wherein the brake means comprises a first friction plate fixed on a free end of the second arm that is provided with the brake means; a second friction plate provided on the second arm, free to rotate about the G axis and free to move toward and away from the first friction plate; bias means mounted on the second arm, for urging the second friction plate toward the first friction plate; the bias means being arranged to be rotatable about the G axis and to be immovable in the direction parallel to the G axis.

10. The sheet workpiece manipulating apparatus of claim 7 wherein the bending press comprises oblong upper and lower dies extending in a horizontal direction for performing a bending operation, and the support mechanism comprises a first movable body provided in front of the bending machine, free to move in a horizontal direction parallel to the longitudinal direction of the oblong upper and lower dies; a second movable body mounted on the first movable body, free to move in the horizontal direction perpendicular to the longitudinal direction of the upper and lower dies; and a third movable body mounted on the second movable body, free to move in the vertical direction.

11. The sheet workpiece manipulating apparatus of claim 10, wherein each of the sheet workpiece gripping pads are detachably mounted on each of the second arms.

12. The sheet workpiece manipulating apparatus of claim 10, further comprising a means for storing the sheet workpiece gripping pads, the storage means comprising a means for engaging with an engaging seat formed on a workpiece grip surface of each of the sheet workpiece gripping pads.

13. The sheet workpiece manipulating apparatus of claim 12, wherein the engaging means of the gripping pad storage means comprises a support arm, upper and lower engaging members respectively mounted on upper and lower surfaces of the support arm, and an actuator capable of simultaneously actuating both of the upper and lower engaging members.

14. The sheet workpiece manipulating apparatus of claim 13, wherein each of the upper and the lower engaging members comprises an elastic tubular member having a free end section, the diameter of which is slightly smaller than that of an engaging seat formed in the workpiece gripping pad;
 a piston member inserted in the elastic tubular member, free to slide thereinside, the piston member expanding the tubular member radially so that the diameter of the tubular member become larger than that of the engaging seat; and
 a piston rod, an end of which is coupled with the piston member, and the other end of which is coupled with the actuator.

15. A device for gripping a sheet workpiece having opposed surfaces, comprising:
 a pair of opposed arms; and
 a pair of sheet workpiece gripping means, each gripping means provided on each of the opposed free ends of the opposed arms for adhering to the opposed surfaces of a sheet workpiece;
 wherein each arm comprises means for detachably attaching said gripping means thereto;
 wherein the attaching means include a permanent magnet and an electrical coil associated with the permanent magnet for generating a magnetic flux opposite to that generated by the permanent magnet,
 wherein the attaching means comprises an engaging member capable of moving between a position where it engages with the engaging seat formed in the gripping means and a position where it disengages therefrom; and
 means for moving the engaging member between the engaging position and disengaging position.

16. The sheet workpiece gripping device of claim 15, wherein the engaging seat is formed in sections of the gripping means which in the vicinity of the positions where the gripping means is attached to the arm.

17. The sheet workpiece gripping device of claim 16, wherein the moving means comprises a spring for urging the engaging member toward the engaging position, and a hydraulic motor for moving the engaging member toward the disengaging position against elastic force.

18. A device for gripping a sheet workpiece having opposed surfaces, comprising:
 a pair of opposed arms; and
 a pair of sheet workpiece gripping pads each provided on each of the opposed free ends of the opposed arms, the gripping pads being respectively provided with suction cup means opposing each other for adhering to the opposed surfaces of a sheet workpiece;
 wherein each arm comprises means for detachably attaching the gripping pad thereto, and
 wherein the gripping pad is formed with a coupling member having a sealing ring, for coupling a pneumatic chamber with a vacuum source.

19. A device for gripping a sheet workpiece having opposed surfaces, comprising:
 a pair of opposed arms; and
 a pair of sheet workpiece gripping pads each provided on each of the opposed free ends of the opposed arms, the gripping pads being respectively provided with suction cup means opposing each other for adhering to the opposed surfaces of the sheet workpiece, each gripping pad comprising a main body for attachment to the arm, a pair of telescoping pad arm members mounted on the opposite sides of the main body and extending in opposite directions and suction cups mounted on each of the free ends of the pad arm members.

20. The sheet workpiece gripping device of claim 19, wherein the main body of each gripping pad is detachably mounted on the arm of the device.

21. The sheet workpiece gripping device of claim 19, wherein the free end of the pad arm member has a T-shaped section and the suction cup is mounted on the T-shaped section of the pad arm member.

22. A device for gripping a sheet workpiece having opposed surfaces, comprising:
 a pair of opposed arms; and
 a pair of sheet workpiece gripping pads each provided on each of the opposed free ends of the opposed arms, the gripping pads being respectively provided with suction cup means opposing each other for adhering to the opposed surfaces of a sheet workpiece;
 wherein the suction cup means respectively have air tight bearing surfaces for adhering to the opposite surfaces of the sheet workpiece, the bearing surfaces respectively define perimeters of respective pneumatic chambers which are connected to a vacuum source in use, and the perimeters of the respective pneumatic chambers have a substantially identical closed loop shape;
 the pair of gripping pads being provided on the pair of the opposed arms in a manner such that when the sheet workpiece is being gripped, corresponding sections of the perimeters of the pneumatic chambers are disposed to be adjacent to each other with the sheet workpiece being interposed therebetween.

* * * * *